United States Patent [19]

Bielemeier

[11] 4,358,817

[45] Nov. 9, 1982

[54] VERTICALLY ADJUSTABLE DEVICE FOR SUSPENDING A FRAME PROVIDED WITH LIGHTING, WITH RADIATORS OR THE LIKE

[75] Inventor: Hans Bielemeier, Bielefeld, Fed. Rep. of Germany

[73] Assignee: Lohmann-Werke GmbH & Co. KG, Bielefeld, Fed. Rep. of Germany

[21] Appl. No.: 163,826

[22] Filed: Jun. 27, 1980

[30] Foreign Application Priority Data

Jun. 30, 1979 [DE] Fed. Rep. of Germany ... 7918876[U]

[51] Int. Cl.[3] ............ B60Q 1/06

[52] U.S. Cl. ............ 362/386; 362/220; 362/233; 362/286; 362/384; 362/391; 362/403; 362/404; 362/430; 362/250; 362/285

[58] Field of Search ............ 362/285-289, 362/384, 220, 386, 233, 391, 250, 404, 430, 403

[56] References Cited

U.S. PATENT DOCUMENTS 3,409,262 11/1968 Soule ............ 362/386 X

*Primary Examiner*—Stephen J. Lechert, Jr.

*Attorney, Agent, or Firm*—Spencer & Kaye

[57] ABSTRACT

A height adjustable suspension for supporting a fixture frame from an overhead location has a drive shaft rotatably supported in the frame and extending parallel to the length dimension of the frame, a motor supported in the frame and operatively connected with the shaft for rotating the same, a plurality of longitudinally spaced winding drums mounted on the shaft for rotation therewith and separate suspension cables associated with each winding drum. Each cable is mounted on the overhead location and has an end directly affixed to the respective drum. The course of each cable from the overhead location to the respective winding drum is, at all points of the cable, perpendicular to the length dimension of the frame.

9 Claims, 12 Drawing Figures

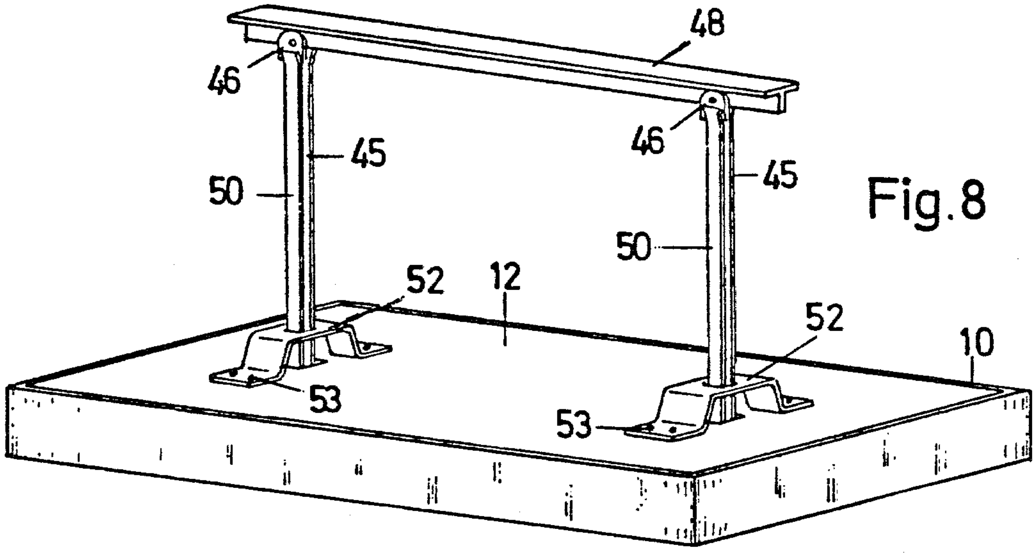
Fig. 8
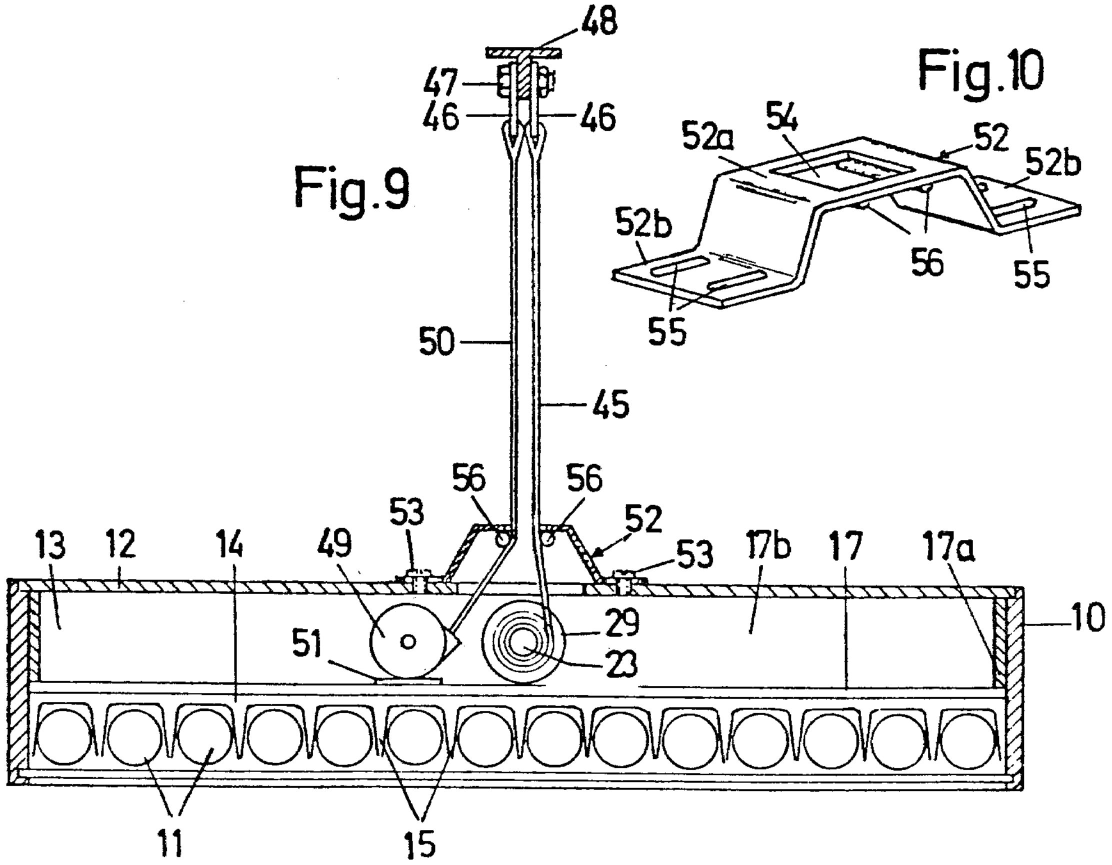
Fig. 9
Fig. 10

VERTICALLY ADJUSTABLE DEVICE FOR SUSPENDING A FRAME PROVIDED WITH LIGHTING, WITH RADIATORS OR THE LIKE

BACKGROUND OF THE INVENTION

The invention relates to a height adjustable device for suspending a frame provided with lights, particularly a frame provided with radiation emitting tubes, and possibly reflectors associated therewith, which may be suspended from the ceiling of a room, from a supporting stand or the like.

Such devices are known in a variety of embodiments which permit a height adjustment of the frame with respect to the ceiling or the like by means of electrical control and moving devices so that it can be arrested in the desired position.

In one known device of this type, two suspension straps are fastened in the area of the upper mount near the ceiling or the like and these suspension straps are wound onto spaced apart reels (for raising the frame) or unwound therefrom (for lowering the frame). These winding reels are fastened on a winding shaft which is coupled to an electric drive motor, both being mounted in a mounting frame fastened immediately below the ceiling or the like or spaced therefrom.

The lower ends of the suspension straps support a floatingly suspended frame holding the radiation emitting tubes.

In spite of a structurally complicated design, possibly including a tension spring connected therebetween (as a retrieving spring) and telescope pipes for guidance, the frame supporting the radiation emitting tubes in such a device is floatingly suspended not only in both horizontal directions of movement, but can also easily set itself into a disadvantageous oblique position.

SUMMARY OF THE INVENTION

It is the object of the invention to provide a height adjustable device of the type described above which is simple in structure, safe in operation and in which the frame has high inherent stability and is secure in its horizontal position above the object to be irradiated.

According to the invention, this is accomplished in a height adjustable device for suspending a frame equipped with lights, radiation emitting devices or the like and employing a winding device formed of a winding shaft with winding reels and an electromotor coupled with the winding shaft for winding or unwinding suspension straps or the like fastened to the frame for shortening or lengthening the effective length of the suspension straps with respect to a mount to be fastened to the ceiling, a supporting stand or the like, in that the winding device is arranged to be rotatable in the center of the frame equipped with the radiation emitting devices between two crossbars supporting the frame, the lower belt ends of the suspension belts are fastened to the winding reels of the winding shaft and the upper belt ends are fastened to holding rails and each crossbar is associated with at least one housing accommodating a safety belt.

It is preferred to guide the suspension straps in their lower region, at a certain distance from the winding shaft, about guide rollers disposed at the crossbars so as to suspend the frame in a way which is secured against undesirable floating.

It is particularly preferred and advantageous to hold the frame by means of four suspension straps of which the lower ends of two such suspension straps can be wound around a winding reel which is fastened to the winding shaft.

With the guidance provided by these four suspension straps, it is possible to suspend the frame at four outer points and thus substantially secure it in its horizontal position. It is of advantage and preferred in this connection for the winding shaft to extend approximately in the center longitudinal axis of the frame while the guide rollers are arranged spaced therefrom inside the frame, preferably in a mirror image arrangement.

In a further embodiment of the invention, the winding device is associated with two suspension straps which are spaced one behind the other in the longitudinal direction of the frame. At a slight distance from the respective winding reel and suspension strap, a drum is associated with each suspension strap. This drum is fastened to the crossbar and accommodates an automatically winding and unwinding belt which arrests itself in any position of the frame and extends parallel to the suspension strap as a safety device.

Such an embodiment according to the invention has several advantages. The winding device as a whole is accommodated within the frame and is thus, on the one hand, protected against soiling and, on the other hand, out of view. The crossbars which support the winding device and are fastened to the inside of the frame considerably reinforce the frame; in particular, they increase its resistance to twisting.

BRIEF DESCRIPTION OF THE DRAWING

FIG. 8 is a perspective view of a radiation emitting device and a holding rail which supports the same via holding straps and belts;

FIG. 9 is a vertical sectional view through the radiation emitting device and the holding rail;

FIG. 10 is a perspective view of a U-bar with belt passage and slots;

DESCRIPTION OF THE PREFERRED EMBODIMENTS

Figure 1:
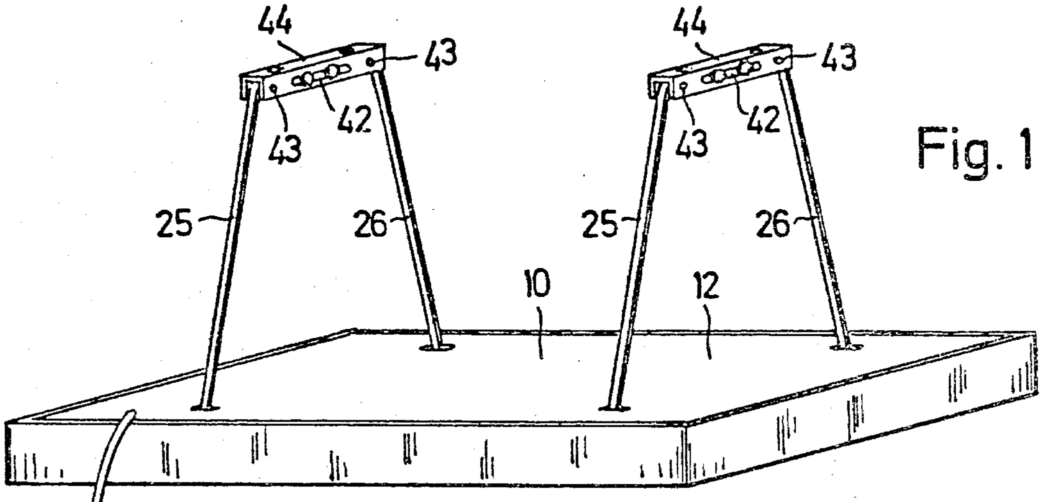
FIG. 1 is a perspective view of a frame with radiation emitting tubes and a suspension device equipped with straps.
Figure 2:
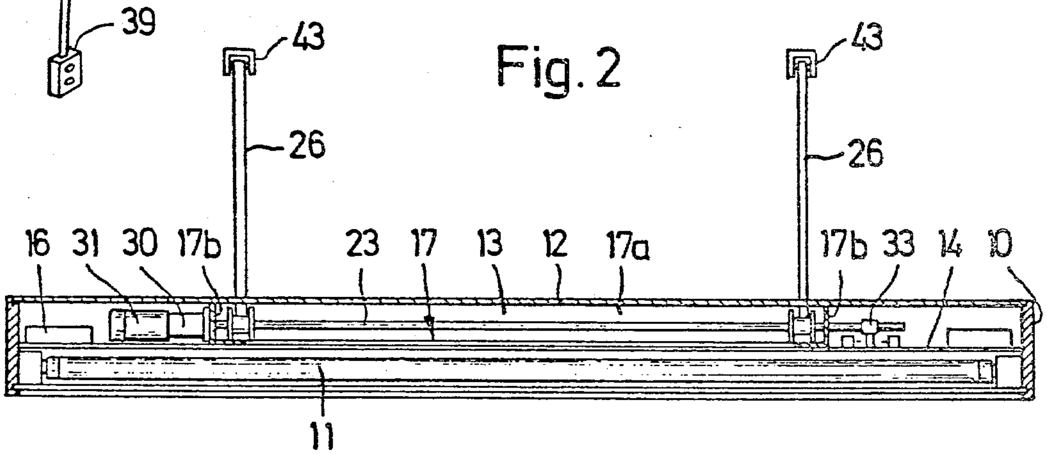
FIG. 2 is a vertical sectional view through the same frame along the section line II—II of FIG. 3.
Figure 3:
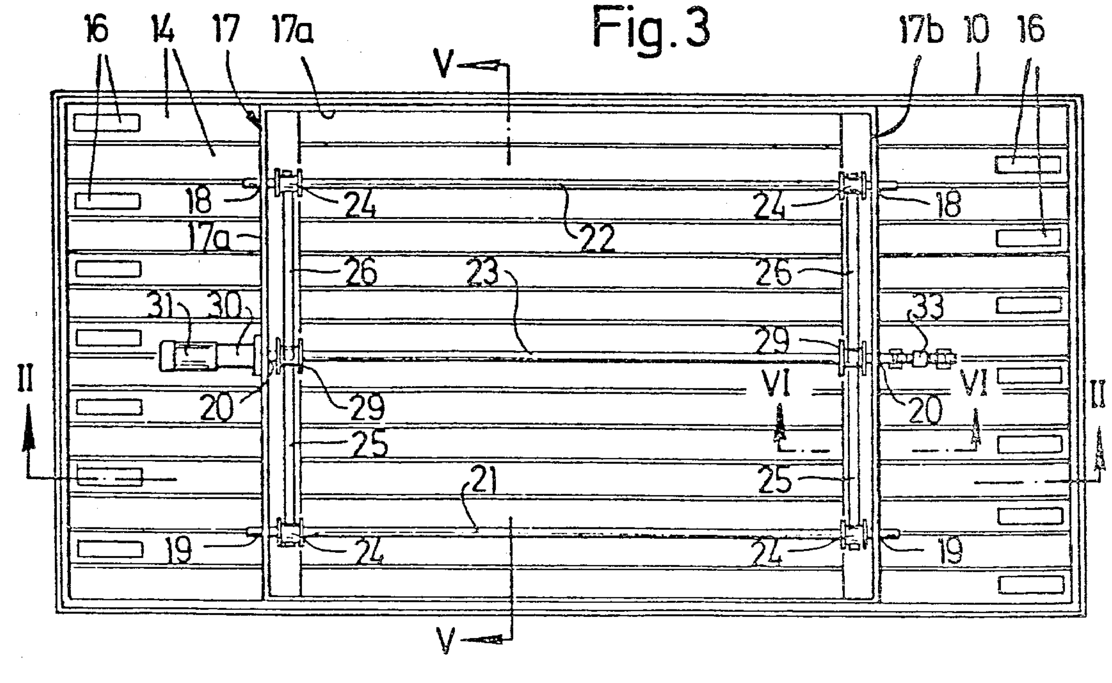
FIG. 3 is a top plan view of the same frame with the shielding plate removed.
Figure 4:
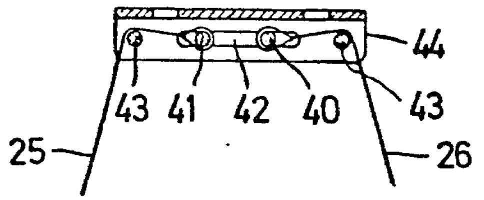
FIG. 4 is a sectional view through the upper mount with straps attached.
Figure 5:
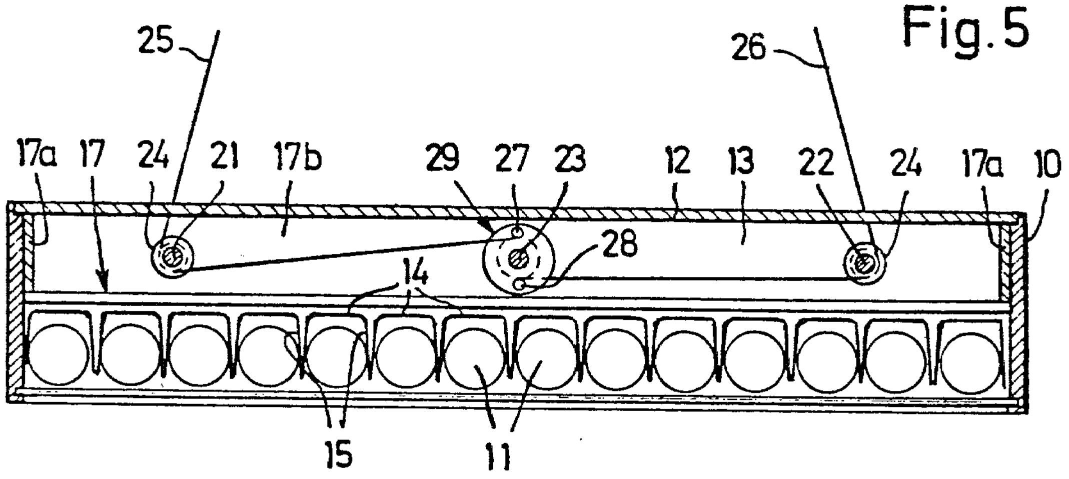
FIG. 5 is a cross-sectional view through the same frame along the section line V—V of FIG. 3.

The numeral 10 identifies a rectangular frame of wood or the like for a cosmetic or medical radiation emitting device in which a plurality of radiation emitting tubes 11 are removably mounted one next to the other in the longitudinal direction of the frame.

This frame 10 is open toward the bottom so that the rays of the radiation emitting tubes 11 can freely fall downwardly onto an object disposed therebelow, such as a prone person (not shown).

Toward the top, the frame 10 is covered by means of a shielding plate 12 so that a free space 13 is formed between the radiation emitting tubes 11 and this shielding plate 12. In this free space 13, above the radiation emitting tubes 11, there is disposed a continuous reflection plate 14 whose ends may be fastened to the frame 10 and which is equipped with longitudinal strips 15 between which extend the radiation emitting tubes 11; the longitudinal strips 15 serve to hold the radiation emitting tubes 11 at a certain distance from one another. At the ends of the reflection plate 14, which may also be corrugated (not shown) instead of being equipped with the vertical longitudinal strips 15, there are disposed the capacitors 16, starters, etc. associated with the radiation emitting tubes.

Figure 6:
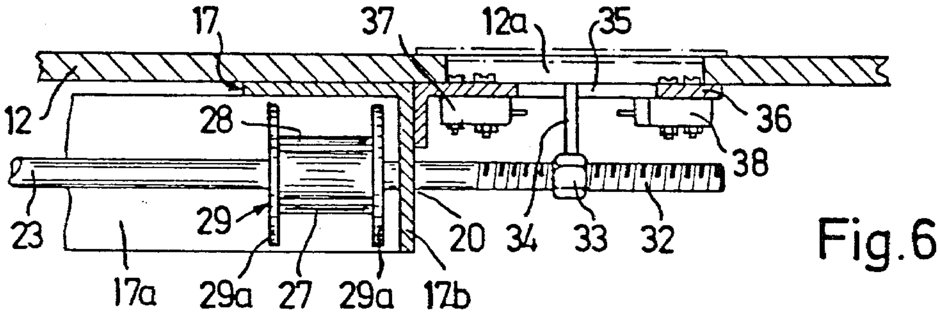
FIG. 6 is a partial sectional view through the same frame along the section line VI—VI of FIG. 3 with a partial view of the switching device.
Figure 7:
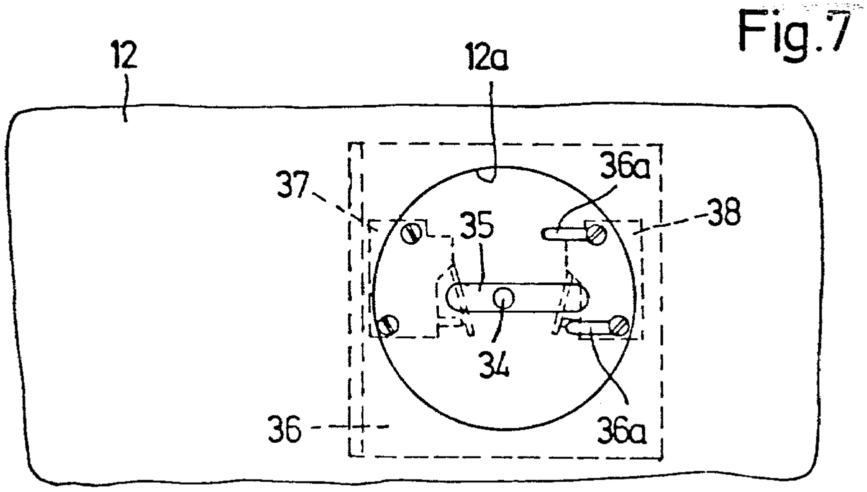
FIG. 7 is a top plan view corresponding to FIG. 6 with access opening.
Figure 11:
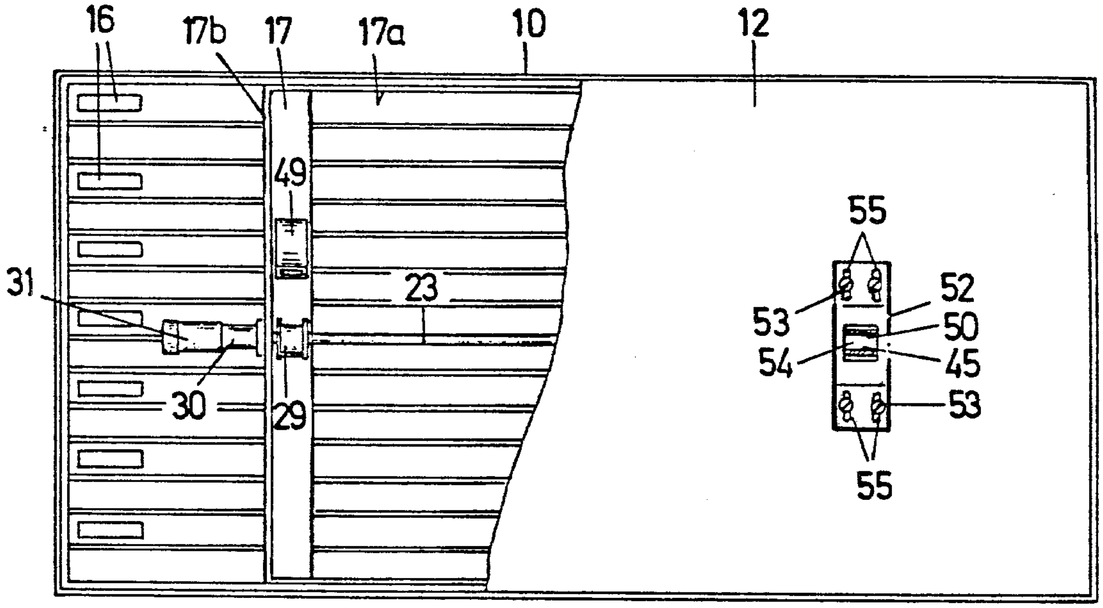
FIG. 11 is a top view of the radiation emitting device with partially cut open shielding plate and a U-bar fastened thereon.

Between the shielding plate 12 and the reflection plate 14 there is disposed a smaller reinforcing frame 17 whose longitudinal strips 17*a* are fastened to the inside of the frame 10 in its center region and whose crossbars 17*b* have an angular profile cross section (FIG. 6).

The crossbars 17*b* are each equipped with two outer bearing bores 18, 19 and with a center bearing bore 20 so as to accommodate—in oppositely arranged pairs—two outer axles 21 and 22 and one center shaft 23. The center shaft 23 extends in the longitudinal center of the frame structure.

In the vicinity of the crossbars 17*b*, the outer axles 21 and 22 are provided with freely rotating guide rollers (discs) 24 around which is guided a suspension strap 25 or 26, respectively.

The inner end of the suspension strap 25 as well as the inner end of the other suspension strap 26 are held at a fastening pin 27 or 28, respectively, which are each fastened between the end discs 29*a* of a reel 29. This reel 29 is rigidly fastened to the center shaft 23 which serves as a winding shaft and is coupled with an electromotor 31 mounted on the crossbars 17*b*, such as, for example, a reversible pole motor (with the intermediary of a reducing gear 30).

The end of the shaft 23 opposite the motor 31 has a thread 32 which guides a nut 33 whose attached switching pin 34 moves back and forth in a slit 35 of a supporting strip 36 in dependence upon the direction of rotation of the shaft 23 and alternatingly actuates end switches 37 and 38 (microswitches) with which the frame 10 moves into its lowest or highest position, respectively, unless the motor 31 is switched off earlier by means of a switch 39.

Since the lowermost position of frame 10 depends on the respective suspension of the holding rail 43 from, for example, a stand or a ceiling, it is necessary to be able to set and limit the lower height of the frame. This is done by shifting the microswitch 38 in slots 36*a* in the carrier plate 36 in the longitudinal direction of shaft 23.

Shifting the microswitch 38 changes the displacement path traveled by the switching pin 34 until it interrupts the circuit which in turn influences the number of revolutions of the shaft 23. An opening 12*a* in the shielding plate 12 assures access from the outside to the carrier plate 36.

The upper free ends of the suspension straps 25 or 26, respectively, are each fastened to pins 40 and 41 which can be longitudinally displaced and fixed in slots 42. Guide pins 43 deflect the suspension belts 25, 26 into the downward direction.

These pins 40, 41 and 43 are each mounted in a holding rail 44 which has a U-shaped cross section, in whose lateral arms there are provided the slots 42 and which forms a mount for the suspension belts 25, 26. This mount can be fastened to the ceiling of a room or the like by means of screws or the like.

Since the distance between the axles 21 and 22 within the frame 10 may preferably be greater than the distance between the guide pins 43 in the mount (holding rail 44), the suspension straps 25, 26 will be oriented toward one another at the top when the frame 10 is suspended. In this way, the entire device requires less space and has a more aesthetic optical effect on the observer.

The effect and operation of the apparatus according to the invention will be explained with the above described embodiment.

The holding rail 44 is fastened to the ceiling or the like in the desired manner by means of screws or the like. The free ends of the holding straps 25 and 26 (four free ends) are each fastened in pairs to the holding rail 44 by means of pins 40 and 41, the length of the suspension straps 25, 26 being matched by shifting and immobilizing the pins 40, 41 in slots 42.

When the motor 31 is switched on by means of a manual switch 39, the winding shaft 23 rotates in the one or the other direction, depending on the position of the reversible pole motor 31. The suspension straps 25, 26 are thus wound together on the reel 29 or are unwound therefrom so that their effective length is shortened or lengthened and they thus raise or lower the frame.

During the rotation of the winding shaft 23, the nut 33 moves on the thread 32 in one or the other direction until its switching pin 34 switches the one or the other switch 36 or 37, respectively, and thus switches off the motor 31 in the desired lower or upper end position of the frame 10.

In a modified embodiment of the winding shaft 23, the winding reels 29 which are rigidly fastened at both ends are connected with the respective lower end of the two holding straps 45 which lie one behind the other in the longitudinal direction of the winding shaft. An electromotor 31 having a reduction gear 30 is mounted on a crossbar 17*b* of the reinforcing frame 17 and is coupled to the winding shaft 23.

The free ends of the two holding straps 45 projecting from the frame 10 are loop-shaped and are equipped with tongues 46 with which they are firmly but releasably connected with the holding rail 48 by means of screw bolts 47 or the like.

According to the invention, a drum 49 is disposed ahead of each winding reel 29, this drum being equipped with a belt 50 which extends parallel to the corresponding holding strap 45 (see FIGS. 8 and 9). The drum is provided with a flange plate 51 or the like and is fastened via this flange plate to the reinforcing frame 17. The upper and free end of each belt 50 is connected with the holding rail 48 in the same manner as the holding straps 45. The drum 49 equipped with the belt 50 serves as a safety device for the respective holding strap 45 in case of any damage thereto.

In the region where the holding straps 45 and belts 50 leave the frame 10, a U-shaped bar 52 is fastened to the shielding plate 12 by means of screws 53. The two U-shaped bars 52, on the one hand, provide the vertical guidance for the belts 45, 50 and, on the other hand, serve to equalize the frame 10 in the horizontal plane as well as to displace its center of gravity. For that purpose, a recess 54 is provided in the upper horizontal arm 52*a* of each U-shaped bar 52 as a passage for the belts 45, 50 and slots 55 are provided in the lower arm 52*b*. Weight tolerances with respect to the frame suspension can be effortlessly equalized by means of these slots 55.

Figure 12:
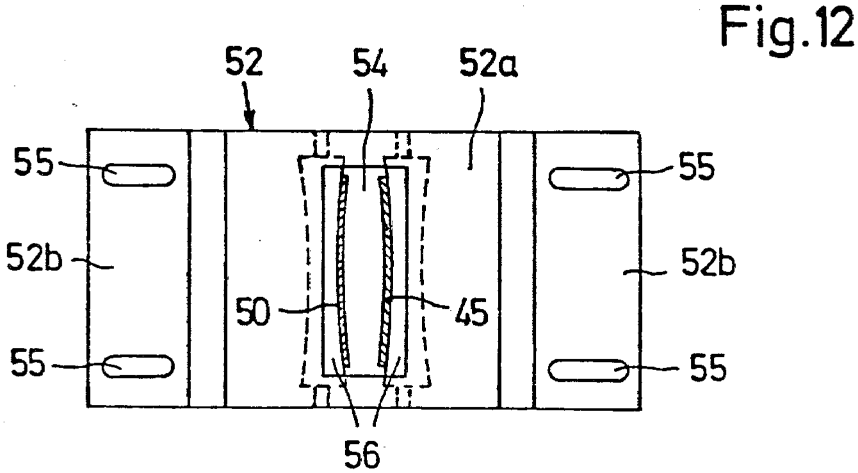
FIG. 12 is a top plan view of the U-bar with guide rollers.

In the immediate region of the recess 54, each U-shaped bar 52 is provided with two guide rollers 56 against which rest the holding straps 45 and belts 50 (see in this connection FIGS. 9–12). The point of contact of the holding strap 45 at the guide roller 56 in conjunction with the point of contact of the belt 50 with the other guide roller 56 assures in every respect an accurately horizontal position of the frame 10 and thus of the entire radiation emitting apparatus. It is advantageous, in order to obtain parallel movement of the belts 45, 50 at the guide rollers 56, to design these rollers in such a way that they are tapered toward the center to form a guide roller or a bent rod, as seen in FIG. 12.

The drum 49 equipped with the belt 50 serves as a safety device in that if there is damage to the holding strap 45 there will not be a sudden disconnection of the radiation emitting device on one side. In such a case, the belt 50 serves as a safety belt since the drum 49 and the belt 50 are designed similarly to an automobile safety belt.

The winding device and the safety device—as described above—are already installed in the frame 10 when the radiation emitting device is delivered so that only the free ends of the belts 45, 50 need be connected with the holding rail 48 when the frame 10 is attached to its suspension. The holding rail 48 may be fastened by means of screws or the like to the ceiling or to a supporting stand.

Fine adjustment of the frame 10 with respect to its center of gravity is possible, as described above, by displacing the U-shaped bars 52 in the range of their slots 55. In this way the frame 10 can be adjusted in any desired or required horizontal position.

The two belts 50, when wound in the respective drums 49, adapt themselves smoothly, as component of the safety device according to the invention, to every phase of the up and down movements of the holding straps 45.

It will be understood that the above description of the present invention is susceptible to various modifications, changes and adaptations, and the same are intended to be comprehended within the meaning and range of equivalents of the appended claims.

I claim:

1. A height adjustable suspension for supporting a fixture frame from an overhead location, said frame having a length dimension, comprising (a) a winding shaft rotatably supported in said frame; said winding shaft having an axis extending parallel to said length dimension;

(b) a motor supported in said frame and operatively fixedly connected with said winding shaft;

(c) a plurality of longitudinally spaced winding drums mounted on said winding shaft for rotation therewith; and (d) separate suspension cables associated with each said winding drum; each cable being mounted on said overhead location and having an end directly affixed to the respective said drum; the course of each cable from said overhead location to the respective said winding drum being, at all points of the cable, perpendicular to said length dimension.

2. A height adjustable suspension as defined in claim 1, wherein said winding shaft lies substantially in a longitudinal center of said frame and said motor is situated symmetrically with respect to said longitudinal center.

3. A height adjustable suspension as defined in claim 1, further comprising a plurality of guide rollers freely rotatably supported in said frame; further wherein with each said winding drum there is associated one pair of said guide rollers; the guide rollers of each pair being situated on both sides of the respective said winding drum and being spaced therefrom in a direction perpendicular to said length dimension; further wherein with each said winding drum there is associated one pair of said cables; the cables of each pair extending from said overhead location about a respective said guide roller to the associated said winding drum.

4. A height adjustable suspension as defined in claim 3, further comprising two lateral shafts mounted in said frame and extending parallel to and on either side of said winding shaft; said lateral shafts carrying said guide rollers.

5. A height adjustable suspension as defined in claim 1, wherein each suspension cable extends vertically from said overhead location to the respective said winding drum.

6. A height adjustable suspension as defined in claim 1, further comprising spaced cross bars affixed to said frame and each extending transversely to said length dimension; said cross bars supporting said winding shaft and said motor.

7. A height adjustable suspension as defined in claim 1, further comprising a safety device having separate safety drums mounted in said frame adjacent each said winding drum and a safety cable mounted on said overhead location, extending downwardly into said frame and wound on the respective said safety drum.

8. A height adjustable suspension as defined in claim 7, further comprising two U-shaped bars releasably fastened on a shielding plate covering the top of the frame, said bars guiding the respective suspension cable and the respectivde safety cable and fixing the position of the frame, said U-shaped bars each having an upper horizontal arm with a recess as a passage for said cables and lower arms with juxtaposed slots for horizontal displacement to adjust said cables transverse to the length dimension of the frame.

9. A height adjustable suspension as defined in claim 8, wherein directly below the recess each U-shaped bar carries freely rotatable guide rollers in contact with said winding cable and said safety cable.

* * * * *